United States Patent [19]
Zerle et al.

[11] 3,848,184

[45] Nov. 12, 1974

[54] METAL SENSING APPARATUS WITH A PROTECTIVE COVER OF A GROUNDED CONDUCTIVE PLASTIC MATERIAL TO PREVENT ACCUMULATION OF ELECTRICAL CHARGES

[75] Inventors: Ludwig Zerle, Mering; Klaus Scharm, Augsburg, both of Germany

[73] Assignee: Firma Erhardt & Leimer KG, Ausburg, Germany

[22] Filed: June 1, 1973

[21] Appl. No.: 365,966

[30] Foreign Application Priority Data
June 7, 1972 Germany............................ 2227627

[52] U.S. Cl. ............................................... 324/41
[51] Int. Cl. ...................... G01r 33/00, G01r 33/12
[58] Field of Search ....................................... 324/41

[56] References Cited
UNITED STATES PATENTS
3,061,775   10/1962   Reznowski ......................... 324/41
3,665,298   5/1972    Geiger ................................ 324/41

FOREIGN PATENTS OR APPLICATIONS
68,577       8/1969   Germany ........................... 324/41
1,187,458    4/1970   Great Britain ..................... 324/41

*Primary Examiner*—Robert J. Corcoran
*Attorney, Agent, or Firm*—W. G. Fasse; W. W. Roberts

[57] ABSTRACT

A sensing system for detecting metallic objects carried by a belt, includes a beam shaped sensor having a detecting coil, and a protective cover over the coil, the belt being adapted to slide over the cover. The cover is of an electrically conductive synthetic material, and is grounded. One or more grounded comblike conductors may be provided between the coil and the cover.

9 Claims, 6 Drawing Figures

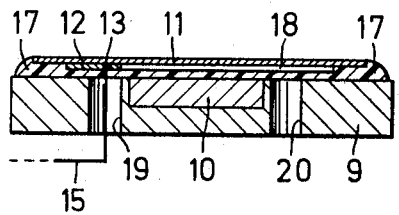
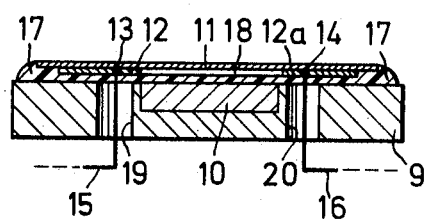
Fig. 3          Fig. 5
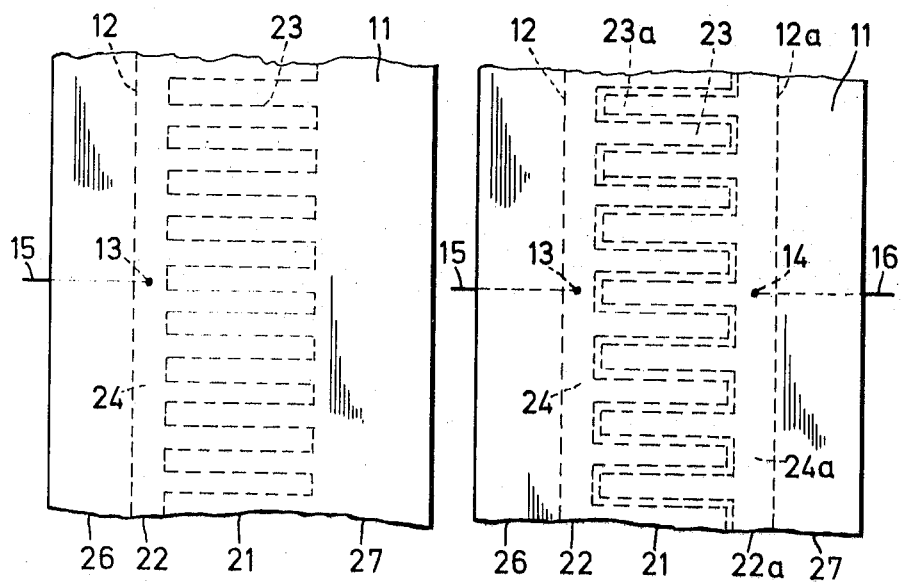
Fig. 4          Fig. 6

METAL SENSING APPARATUS WITH A PROTECTIVE COVER OF A GROUNDED CONDUCTIVE PLASTIC MATERIAL TO PREVENT ACCUMULATION OF ELECTRICAL CHARGES

BACKGROUND OF THE INVENTION

The invention relates to coil systems for transverse sensor beams employed as detectors for foreign metallic objects in material transported by an endless conveyor belt, and is more particularly directed to plastic covers for such systems.

Metallic foreign objects transported by a conveyor system frequently present a hazardous condition. If the conveyor system forms part of a manufacturing process, such foreign objects may present a dangerous hazard for the processing machinery inasmuch as they may cause substantial damage to such machinery. Therefore, detector devices have been provided which monitor such material conveyors for metal or ferromagnetic foreign objects, and indicate their presence upon detection. In most cases such detector devices are designed as transverse beams which incorporate a magnetic coil system on one side thereof that is affixed to a carrier plate over which the conveyor belt passes. A plastic cover is provided over the device in order to protect the coil system against damage and the effect of moisture.

Conveyor belts made from material with a high friction coefficient, e.g., material with a polyamide fiber base, can, by friction against a plastic cover, produce high electrostatic charges. Uncontrolled discharges in the immediate vicinity of the detector coils can induce strong electric pulses in the coils and thus give false indications of the presence of foreign objects. Usually a great deal of electric and/or electronic circuitry is required to circumvent such error impulses.

OBJECT OF THE INVENTION

It is the purpose of the present invention to avoid the electrostatic charging of the protective cover and by relatively simple means prevent such false impulses from affecting the coil system.

SUMMARY OF THE INVENTION

According to the invention this objective is attained by the use of electrically conducting synthetic materials for the protective covering. The material is adhesively bonded to the carrier plate at its edges and is grounded by a ground wire. The electric resistivity of the material is rated such that the coil system is not affected while on the other hand any charge accumulation is prevented. In this manner electric discharges and false impulses on the coil system can be avoided without any additional electric or electronic circuitry.

The cover may be provided with a comblike meandering conductor arrangement which, for the purpose of shunting electrostatic charges to ground, is connected to wires which extend to ground via holes provided therefor in the carrier plate. Hereby and in conjunction with the electric conductivity of the cover material, the accumulation of electric charges is improved while at the same time providing grounding of any such charges. The comblike conductor arrangement permits additional shielding of the coil system against extraneous electric disturbance fields which may be produced by electric switching processes in the conveyor power system or by electric discharges occuring elsewhere and by other similar causes. It also prevents the occurrence of large eddy currents which might affect the coil system.

The comblike conductor system is attached to the cover by means of an electrically conducting adhesive in order to provide effective electric contact and thus insure positive electrical conductance before the accumulation of electric charges on the cover.

The bars of the comblike conductor system are located in the center portion of the cover width above the coil system, thereby ensuring that the coil system responds to metallic foreign objects on the conveyor belt in spite of the additional shielding provided by the comblike conductor system.

The outer portions of the cover are kept free of any conductor connections in order to permit moisture-proof bonding of the cover to the coil carrier plate. This arrangement serves in furtherance of the protective function of the cover which, besides being moisture-proof, also provides protection of the coil system against the intrusion of dirt and against other mechanical or chemical effects.

A further useful development of the invention consists in the provision of two interdigitated, but non-contacting comblike conductor arrangements of identical coverage. Both are connected with the protective cover by conductive adhesives and grounded by grounding wires. This dual arrangement provides a symmetrical distribution of the electrical resistivity and shielding characteristics of the cover. The coil system therefore retains its functional response to foreign metal objects on the conveyor belt without additional detrimental effects.

BRIEF FIGURE DESCRIPTION

In order that the invention may be clearly understood, it will now be described, by way of example, with reference to the accompanying drawings, wherein:

FIG. 3 is a cross-section of the cover with the conductor arrangement attached thereto and the carrier plate with the coil system, according to another embodiment of the invention;

FIG. 4 is a top view of a portion of the cover of FIG. 3 showing the comblike conductor arrangement;

FIG. 5 is a cross-section of the cover with a dual interdigitated conductor arrangement and the carrier plate with the coil system according to a further embodiment of the invention; and FIG. 6 is a top view of a portion of the cover with the conductor arrangement according to FIG. 5.

DETAILED DESCRIPTION OF EXAMPLE EMBODIMENTS

Figure 1:
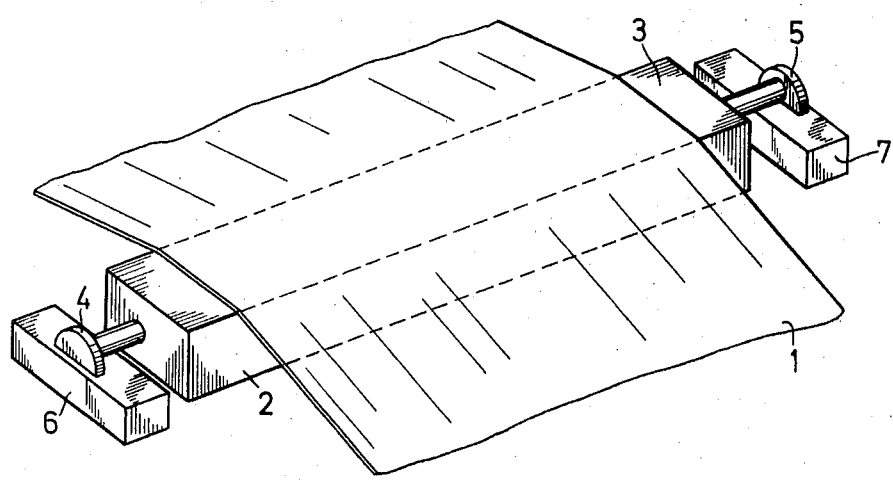
FIG. 1 is a perspective view of a detector sensor head in the form of a transverse beam over which a conveyor belt runs which is to be monitored for foreign objects, which may encorporate the protective cover and conductor arrangement according to the invention.

As shown in FIG. 1, a conveyor belt 1, which is to be monitored for foreign metal objects, is guided with a slight curvature over a beam shaped sensor head 2. Under the surface 3 of the sensor head 2 a coil system is attached which responds to metallic foreign objects carried by the conveyor belt 1. The sensor head 2 is supported via the bearings 4 and 5 by suitable supports 6 and 7 of the machine frame.

Figure 2:
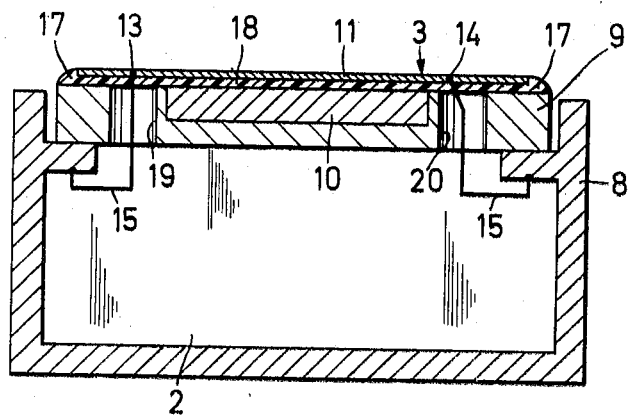
FIG. 2 is an enlarged cross-section of the sensor head according to FIG. 1, depicting the protective cover and the conductor arrangement according to the invention.

According to FIG. 2, the boxlike section 8 of the sensor head 2 incorporates a carrier plate 9. The coil system 10 is embedded in the carrier plate 9, as indicated by cross-hatching. This coil system 10 extends within the carrier plate 9 throughout the width of the sensor head 1, as shown in FIG. 1. According to the invention, a cover 11 is provided over which the conveyor belt 1 is adapted to slide. This cover 11 is made of plastics material and serves the purpose of protecting the coil system against damage and moisture. If this cover is made of non-conducting (dielectric) synthetics, considerable electrostatic charges may be generated by the friction between the conveyor belt and the cover, thereby producing discharges which will cause disturbance impulses in the coil system and thus simulate foreign metallic objects being carried on the conveyor belt. Such discharges, if strong enough and continuous, may even cause failure of the detector system. According to the present invention, therefore, the cover 11 is made of an electrically conducting synthetic material. For the purpose of shunting any such charge accumulations to ground, a ground wire 15 is provided to connect the cover directly with the box section 8. The electrical resistivity is rated such that no disturbing influence on the a.c. operated coil system 10 is caused, while at the same time allowing no undesirable charge accumulations on the cover 11.

According to the embodiment of the invention depicted in FIGS. 3 and 4, a thin comblike conductor arrangement 12 is provided between the carrier plate 9 with the coil system 10 and the cover 11 for the purpose of collecting and shunting away any electrostatic charge accumulations on the cover 11 and for shielding the coil system 10 from external disturbance fields. The comblike conductor arrangement 12 also prevents the formation of sustantial eddy current fields which might influence the coil system. The conductor arrangement 12 is bonded to the cover 11 in the form of a printed copper foil by conventional processing techniques. At the point 13 it is connected to the ground wire 15, the wire being led down through a hole 19 in the carrier plate 9 and connected to the box section 8 (FIG. 2) of the sensor head 1. This arrangement allows the grounding of the conductor comb at any number of locations simply by connecting it with as many ground wires as desired. By bonding the edges 17 of the cover 11 to the carrier plate 9 and by filling the inner space 18 with an insulating plastics adhesive the conductor comb 12 can be completely protected against moisture and other corrosive influences.

FIG. 4 is a top view of the cover 11, which on its underside is provided with a conductor arrangement 12, as depicted by dashed lines. This conductor arrangement 12 is shaped in the form of a comb in the area 21 of the cover 11 and after assembly is located above the coil system 10 (FIG. 3). The area 22 of the cover width contains the collector bar 24 of the comb fingers 23. FIG. 4 shows only one ground wire contact point 13 on the collector bar 24 in the cover width area 22. The areas 26 and 27 are kept free of conductors so that these areas may be filled with adhesive in bonding the cover to the carrier plate 9 and so provide moisture-proof protection of the conductor arrangement (see FIG. 3). The conductor arrangement is completely sealed off by the adhesive layer at 18.

FIG. 5 shows a cross-section and FIG. 6 a corresponding top view of a dual conductor arrangement 12 and 12a, which for symmetry reasons have interlocking fingers as depicted in FIG. 6. The two separate conductor arrangements 12 and 12a are electrically insulated from each other except that both are grounded to the same ground via the contact points 13 and 14. As in the previously described single conductor arrangement, the areas 26 and 27 of the cover are left free of conductors. The areas 22 and 22a are covered by the two collector bars 24 and 24a, while the area 21 is covered by the comb fingers 23 and 23a, which upon final assembly are located above the coil system 10 of the sensor head. Although FIGS. 5 and 6 show only one contact point 13 and 14, respectively, together with the corresponding ground wires 15 and 16 respectively, any desired number of such ground connections may be provided for each of the comblike conductors 12 and 12a in order to safeguard the coil system against external disturbance fields and to ensure proper collection and grounding of the electrostatic charges of the cover 11. With respect to the protection against moisture and other corrosive influences by the bonding of the cover 11 together with the attached conductor arrangements to the carrier plate 9 at the locations 17 and the space 18, the same considerations apply as in the embodiment according to FIGS. 3 and 4. Also, the improved version with the dual interlocked comblike conductor arrangement, as depicted in FIGS. 5 and 6, has the same type of printed copper foil attachment to the cover 11 as described previously. The special adhesive used consists of electrically conducting material to ensure good electrical contact. All other characteristics of the dual interlocked comblike conductor arrangement of FIGS. 5 and 6 are the same as for the previously described single arrangement of FIGS. 3 and 4.

Although the invention has been described with reference to specific example embodiments, it is to be understood, that it is intended to cover all modifications and equivalents within the scope of the appended claims.

What is claimed is:

1. In a sensing system for detecting metallic objects of the type having a beam shaped sensor head containing detector coil means and a protective cover over the coil means, whereby foreign metallic objects passed over the cover are detected by the coil means; the improvement wherein said beam shaped sensor head is comprised of a carrier plate, said coil means being mounted on said carrier plate, said cover being of an electrically conducting synthetic material, the edges of said cover being bonded to said carrier plate, and means grounding said cover, said cover having a resistivity that prevents accumulation of electrical charges on said cover without impairing the detecting function of said coil means.

2. The sensing system of claim 1, further comprising a comblike conductor affixed to said cover between said cover and said coil means, aperture means in said carrier plate, and grounded lead means extending through said aperture means and connected to said comblike conductor for shunting electrostatic charges to ground.

3. The sensing system of claim 2, further comprising electrically conductive adhesive means for affixing said comblike conductor to said cover.

4. The sensing system of claim 2, wherein said comblike conductor has a plurality of fingers positioned in the center portion of said cover above said coil means.

5. The sensing system of claim 2, wherein the edges of said cover are bonded with a moisture-proof bonding to said carrier plate, the edge portions of said cover being free of conductors.

6. The sensing system of claim 1, further comprising a pair of comblike conductors affixed to said cover between said cover and said coil means, said comblike conductors having interlocked fingers, whereby the fingers of said conductors are intermeshed without electrical contact therebetween, and further comprising separate conductor means connected to ground said comblike conductors.

7. The sensing system of claim 6, further comprising electrically conducting adhesive means for bonding said comblike conductors to said cover.

8. The sensing system of claim 2, comprising an insulating adhesive material completely covering said comblike conductor, said insulating adhesive bonding said comblike conductor between said cover and said carrier plate.

9. A sensing system for sensing foreign metallic objects on a conveyor belt, comprising an elongated sensing head comprised of a carrier plate, a detecting coil mounted on said carrier plate, an electrically conductive synthetic cover over said coil having its edges bonded to said cover plate, and means for grounding said cover, whereby foreign objects on said belt are detected by said coil when said belt is slid across said cover, said cover having a resistivity preventing accumulation of electrical charges on said cover without inhibiting detection of said metallic objects by said coil.

* * * * *